Patented May 25, 1937

2,081,667

UNITED STATES PATENT OFFICE 2,081,667

PROCESS FOR TREATING SEEDS, BULBS, AND TUBERS

George Edward Heyl, Mill Hill, England

No Drawing. Application August 29, 1935, Serial No. 38,463. In Great Britain August 31, 1934

7 Claims. (Cl. 47—58)

This invention relates to a process for treating seeds, bulbs and tubers, which are hereinafter referred to generically as seeds.

The methods of fertilization in use at the present day are in general confined to incorporating various fertilizers into the soil such as by raking fertilizer into the soil prior to planting seeds or the like or spraying the ground with liquid fertilizer.

According to the present invention there is provided a process for treating seeds, consisting in applying thereto a coating of material adapted to form a protective elastic membrane around the seeds. This protective elastic membrane may consist of rubber latex, or latex of isonandra, gutta or quayule or any other latex forming an elastic insoluble membrane when dry around the seeds, to which latex fertilizer may be added if desired, in order to afford a supply of plant foods to the growing plants by gradual diffusion due to moisture dissolving the soluble added fertilizing constituents assisted by the natural serum or bacteria contained in the latex. These may be increased by adding nitrogen collecting bacteria such as *Clostridium pasteurianum* and other suitable cultures. The fertilizer added to the latex may consist, for instance, of ammonia, or potassium hydrate and cocoanut oil, with or without the addition of ammonia. Experiments have shown that the potassium hydrate and cocoanut oil mixture is particularly efficacious in preventing various forms of disease and therefore has a particular application for use with seeds which are susceptible to such diseases. The rubber latex is diluted with water, the concentration of the latex being determined by the condition and quality of the soil.

The amount of fertilizer used depends upon the resistance of the seed or the like to the action of the fertilizer and the type of fertilizer required depends on the kind of plant that is being grown, the coating of latex preventing the fertilizer acting upon the seed in a too stringent manner. The fertilizers or fungicides may be mixed directly with the latex mixture prior to coating the seeds therewith, or alternatively the seeds may be dusted over with fertilizer or fungicide in powder form subsequent to the coating with latex, which may or may not already contain fertilizer such as ammonia and/or fungus or virus preventing chemicals. The fertilizer dusted over the seeds may be of any required nature; for instance, a mixture of potassium phosphate and ammonium nitrate. The advantage of the present process is that a much wider use of fertilizer and the like may be made than heretofore and the same or better results may be obtained by utilizing much smaller quantities of fertilizer, because the fertilizer reaches the seeds through the protective membrane of, for instance, rubber latex which acts as a diaphragm, the fertilizer being gradually brought into solution due to the moisture from the surrounding soil penetrating through the rubber latex coating, thus carrying plant food to the seed or the like. Another advantage of the present process is that the latex coating affords a moisture holding membrane around the seed, a very large increase of growth and fruit forming qualities being the result.

What I claim is:—

1. A process for treating seeds, consisting in coating the seeds with latex, with the latex impregnated with constituents such as a fertilizer and a fungicide to assist in the growth of the plant.

2. A process for treating seeds, consisting in coating the seeds with latex impregnated with a fertilizer and a fungicide.

3. A process for treating seeds, consisting in coating the seeds with latex impregnated with a fertilizer, nitrogen collecting bacteria, and fungicide harmless to bacteria.

4. A process for treating seeds, consisting in coating the seeds with latex impregnated with ammonia and cocoanut oil.

5. A process for treating seeds, consisting in coating the seeds with latex impregnated with potassium phosphate and ammonium nitrate.

6. As a new article of manufacture, latex impregnated with fertilizer and providing a coating for seeds.

7. As a new article of manufacture, a seed coating made up of latex admixed with fertilizer and a fungicide.

GEORGE EDWARD HEYL.